(12) United States Patent
Wang et al.

(10) Patent No.: US 8,300,883 B2
(45) Date of Patent: Oct. 30, 2012

(54) SKETCH GENERATING SYSTEM AND METHOD FOR GENERATING SKETCH BASED ON IMAGE

(75) Inventors: Jianyu Wang, Shenzhen (CN); Liang Wang, Shenzhen (CN); Xiaofang Wu, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 461 days.

(21) Appl. No.: 12/761,604

(22) Filed: Apr. 16, 2010

(65) Prior Publication Data

US 2010/0254594 A1 Oct. 7, 2010

Related U.S. Application Data

(63) Continuation of application No. PCT/CN2008/073280, filed on Dec. 1, 2008.

(30) Foreign Application Priority Data

Nov. 29, 2007 (CN) .......................... 2007 1 0178386

(51) Int. Cl.
*G06K 9/00* (2006.01)
(52) U.S. Cl. ......... 382/100; 382/155; 382/203; 382/284
(58) Field of Classification Search .................. 382/100, 382/155, 159, 190, 195, 203, 217, 218, 276, 382/284
See application file for complete search history.

(56) References Cited

U.S. PATENT DOCUMENTS

| | | | |
|---|---|---|---|
| 2002/0018595 A1* | 2/2002 | Kwak | 382/203 |
| 2003/0095701 A1* | 5/2003 | Shum et al. | 382/155 |
| 2005/0100243 A1* | 5/2005 | Shum et al. | 382/276 |
| 2005/0286799 A1* | 12/2005 | Huang et al. | 382/275 |
| 2006/0082579 A1* | 4/2006 | Yao | 345/473 |
| 2007/0019885 A1* | 1/2007 | Chatting et al. | 382/289 |

FOREIGN PATENT DOCUMENTS

| | | |
|---|---|---|
| CN | 101034481 A | 9/2007 |
| CN | 101056617 A | 10/2007 |
| CN | 101159064 A | 4/2008 |
| JP | 10187931 A | 7/1998 |
| JP | 2000067218 A | 3/2000 |

OTHER PUBLICATIONS

Shen et al., "Digital Cartoon and Animation: Computer Generation of Facial Cartoon," Frontier Science, 1:11-17, 23 (2007). Abstract Only.
First Office Action for Chinese Application No. 2007101783865, dated Aug. 21, 2009.
Second Office Action for Chinese Application No. 2007101783865, dated Mar. 1, 2010.

* cited by examiner

*Primary Examiner* — Andrew W Johns
(74) *Attorney, Agent, or Firm* — Marshall, Gerstein & Borun LLP

(57) ABSTRACT

A sketch generating system and a method for generating a sketch based on an image are provided. The system includes: a sketch database and a generating subsystem. The sketch database stores local image samples and corresponding local sketch units in different categories. The generating subsystem extracts geometrical features from an input image, retrieves local image units from the input image according to the geometrical features; as to each local image unit retrieved, searches the sketch database for a local sketch unit corresponding to a local image sample having a largest similarity value with the local image unit, and combines all local sketch units found to form one sketch.

20 Claims, 4 Drawing Sheets

_US 8,300,883 B2_

SKETCH GENERATING SYSTEM AND METHOD FOR GENERATING SKETCH BASED ON IMAGE

CROSS-REFERENCE TO RELATED APPLICATIONS

This is a continuation of International Application No. PCT/CN2008/073280 filed Dec. 1, 2008, which in turn claims the priority benefit of Chinese Patent Application No. 200710178386.5 filed Nov. 29, 2007, the entire respective disclosures of which are incorporated herein by reference.

FIELD OF THE INVENTION

The present invention relates to image processing technologies, and more particularly, to a sketch generating system and a method for generating a sketch based on an image.

BACKGROUND OF THE INVENTION

At present, along with rapid development of the Internet, network virtual life becomes more and more important. Compared with true-life figures, a network avatar becomes an important presence mode in a personal network space. However, few people take a true-life photo as the network avatar in a network environment. Usually, they adopt a cartoon sketch to express his/her avatar instead. Currently, most sketches are developed by network content providers, and users choose from these sketches. This mode requires low costs and provides the users with free sketches as a value-added part of network services. However, along with an increase of the number of users, the sketches of different users are all most the same, which cannot satisfy the users' individualized requirements to the network sketches. Although a few users can invite artists to design individualized sketches for them, it costs much and cannot benefit all network users.

In order to enable a computer to generate sketches automatically, some technical schemes for generating sketches are provided. For example, Brennan in MIT presents an interactive caricature generating system in 1982; Japanese scholar Murakami et al. develops a template-based facial caricature system PICASSO and a web-based edition web-PICASSO. However, the above caricature generating schemes are mainly based on rules manually pre-defined, they can just generate sketches with limited variations, and thus makes the sketches unexpressive.

In order to generate more individualized sketches automatically, some improved technical schemes are provided currently. For example, Chinese "Software Transaction" discloses "an individualized cartoon system based on images" in issue 09, vol. 13, 2002; US patent publication No. US2003/0095701A1, US2005/0100243A1 and US2006/0082579A1 disclose similar techniques for generating sketches automatically. These techniques for automatically generating sketches adopt a sample-based learning policy, and adopt a non-parameter sampling method to model a complicated relationship between an image and a corresponding sketch, and thus generate an individualized sketch for any image according to the learned relationship.

However, a main defect of the above methods lies in that, they adopt short lines as basic geometric elements to construct a sketch. One sketch usually consists of many short lines and it is required to extract, analyze and compute for each short line. Therefore, computation load is large and processing efficiency is low. In addition, the above methods require a strict corresponding relationship between an original image and a sketch, and thus can only generate limited styles of sketches. Because the sketch is strictly in line with the original image, the sketch seems too rigid and it is difficult to change its style, e.g. to support an exaggerated style.

SUMMARY OF THE INVENTION

In view of the above, an embodiment of the present invention provides a sketch generating system, so as to automatically generate a sketch with individualized characteristics based on a true-life image provided by a user, reduce a computation load and improve efficiency for generating the sketch at the same time.

Another embodiment of the present invention provides a method for generating a sketch based on an image, so as to automatically generate a sketch with individualized characteristics based on a true-life image provided by a user, reduce a computation load and improve efficiency for generating the sketch at the same time.

According to an embodiment of the present invention, a sketch generating system is provided. The sketch generating system includes: a sketch database and a generating subsystem; wherein the sketch database is adapted to store local image samples and corresponding local sketch units in different categories;

the generating subsystem is adapted to extract geometrical features from an input image, retrieve local image units from the input image according to the geometrical features; with respect to each local image unit retrieved, search the sketch database for a local sketch unit corresponding to a local image sample having a largest similarity value with the local image unit, and combine all local sketch units to form one sketch.

Preferably, the sketch generating system further includes: a training subsystem, adapted to generate a training model and local image samples according to training image samples, generate corresponding local sketch units according to the local image samples, and save the local image samples and the corresponding local sketch units in the sketch database in different categories.

Preferably, the training subsystem includes:

an image detection training module, adapted to train to detect an effective area of each training image sample, and generate an effective area detection model;

an image geometrical feature extraction training module, adapted to train to extract geometrical features from the effective area of each training image sample and generate an Active Shape Model;

a similarity analysis and categorization training module, adapted to retrieve the corresponding local image samples from the effective area of each training image sample according to the geometrical features, extract characteristic parameters of each local image sample, perform a similarity analysis training to generate a similarity model, and save the characteristic parameters of each local image sample into the sketch database; categorize the local image samples, and generate at least one corresponding local sketch unit corresponding to each local image sample, and save the local image samples and the corresponding local sketch units into the sketch database in different categories.

Preferably, the generating subsystem includes:

an image detecting module, adapted to detect an effective area of the input image according to the effective area detection model;

an image geometrical feature extracting module, adapted to extract the geometrical features from the detected effective area according to the Active Shape Model;

a local image retrieving module, adapted to retrieve the local image units from the effective area according to the geometrical features;

a similarity analyzing module, adapted to analyze, with respect to each local image unit, a similarity between the local image unit and each local image sample in the sketch database according to the similarity model, obtain the local image sample having a largest similarity value with the local image unit;

a sketch combining module, adapted to retrieve the local sketch units respectively corresponding to the local image samples having the largest similarity values with the local image units from the sketch database, and combine all the local sketch units retrieved into one sketch according to global geometrical features.

Preferably, the sketch combining module is further adapted to directly take at least one local image unit as at least one local sketch unit according to a user instruction.

Preferably, the generating subsystem further includes:

a scaling processing module, adapted to scale the effective area detected by the image detecting module or the local image units retrieved by the local image retrieving module.

Preferably, the similarity analysis and categorization training module is further adapted to generate at least one local sketch unit of different styles for each local image sample; and the sketch combining module further comprises a style selecting unit, adapted to output style options to a user and receive a selection instruction from the user, select one of the at least one local sketch unit corresponding to the local image sample as a local sketch unit corresponding to the local image unit according to the user's selection instruction.

According to another embodiment of the present invention, a method for generating a sketch based on an image is provided. The method includes:

A: saving local image samples and corresponding local image units into a sketch database in advance;

B: extracting geometrical features from an input image, retrieving local image units from the input image according to the geometrical features; with respect to each local image unit retrieved, searching the sketch database for a local sketch unit corresponding to a local image sample having a largest similarity value with the local image unit, and combining all local sketch units to generate one sketch.

Preferably, before the step B, the method further includes:

B0: generating a training model and local image samples according to a training image sample, generating corresponding local sketch units according to the local image samples; and saving the local image samples and the corresponding local sketch units into the sketch database.

Preferably, the step B0 includes:

a1: train to detect an effective area of the training image sample according to an effective area detecting technique, and generating an effective area detection model;

a2: train to extract geometrical features of the effective area, and generating an Active Shape Model;

a3: retrieving the local image samples from the effective area according to the geometrical features extracted and categorizing the local image samples;

a4: extracting characteristic parameters of each local image sample and performing similarity analysis training, generating a similarity model, and saving the characteristic parameters of each local image sample into the sketch database;

a5: generating at least one local sketch unit for each local image sample, and saving the at least one local image sample and the corresponding local sketch unit into the sketch database.

Preferably, the generating the at least one local sketch unit for each local image sample in step a5 includes: generating multiple local sketch units of different styles or skills for each local image sample.

Preferably, the step B includes:

b1: detecting an effective area of the input image according to the effective area detection model;

b2: extracting the geometrical features from the effective area according to the Active Shape Model;

b3: retrieving the local image units from the effective area according to the geometrical features;

b4: with respect to each local image unit, analyzing a similarity between the local image unit and each the local image sample in the sketch database according to the similarity model, and obtaining a local image sample having a largest similarity value with the local image unit;

b5: with respect to each local image unit, retrieving from the sketch database the local sketch unit corresponding to the local image sample having the largest similarity value with the local image unit;

b6: combining all the local sketch units retrieved into one sketch according to the geometrical features.

Preferably, the step b5 includes:

taking at least one local image unit as at least one local sketch unit according to a user instruction.

Preferably, the input image is a facial image and the local image units are respectively local organ images on a person's face; wherein the step b4 includes:

c1: retrieving a rectangle image area surrounding a specific organ from a local organ image and taking the rectangle image area as a search image;

c2: determining whether the search image is a facial contour image, proceeding to step c9 if the search image is a facial contour image, proceeding to step c3 if the search image is not a facial contour image;

c3: filtering noises off the search image;

c4: configuring a coverage range and filtering irrelevant information outside the coverage range from the search image;

c5: determining whether the search image is a mouth image; proceeding to step c6 is the search image is a mouth image; proceeding to step c7 if the search image is not a mouth image;

c6: scaling the mouth image into an average shape vector;

c7: extracting image characteristic parameters from the search image;

c8: analyzing a similarity between the search image and each local image sample in the sketch database one by one according to the image characteristic parameters, determining a local image sample which has a largest similarity value with the search image, and terminating step b4;

c9: defining an outline feature point set of the search image and fitting outline feature points by cubic spline to form a fitting curve;

c10: performing equidistant sampling on the fitting curve to form an updated outline feature point set;

c11: scaling the outline feature points;

c12: compare the search image with corresponding local image samples in the sketch database one by one, calculate similarity values, and determine a local image sample having the largest similarity value with the search image.

Preferably, the step b5 includes:

outputting style options to a user, and selecting one local sketch unit from multiple local sketch units corresponding to the local image sample which has the largest similarity value with the local image unit, and taking the local sketch unit selected as a local sketch unit corresponding to the local image unit.

Preferably, depth relationships between different local image units are pre-configured according to a hiding relationship; and the step b6 includes:

placing the local sketch units respectively corresponding to all the local image units retrieved onto a canvas to form one sketch.

Preferably, the method further includes: after the step b1, scaling the effective area;

after the step b3, scaling each local image unit.

Preferably, the input image is a facial image, the local image unit is a local organ image of a person's face and the local sketch unit is a cartoon organ sketch.

The present invention retrieves various typical local image samples such as typical image samples of facial organs in advance, and save a corresponding local sketch unit such as a corresponding facial organ sketch for each typical local image sample. During a generating phase, local image units are retrieved from an input image correctly, and corresponding local sketch units are found from the sketch database and are then combined into one complete sketch. In an embodiment of the present invention, a semantically-based method is used for retrieving the local image units. Therefore, the local image units may be retrieved and selected as a whole. And since a complete image usually contains only limited local image units, e.g., one facial image may be divided into only local image units of face shape, eyes, ears, nose and mouth, compared with the conventional method which forms a sketch based on a large number of short lines, the present invention can reduce computation load and increase efficiency for generating a sketch.

The present invention further includes a training phase. Based on a true image, image detection training, image geometrical feature extraction training, similarity analysis training and categorization training may be performed. Thereby, precision for generating a sketch is improved, and similarity and reality between the sketch and the true image are also improved.

Furthermore, in the present invention, local sketch units of multiple styles or skills may be stored for a local image sample. Therefore, it is possible to generate a sketch with individualized characteristics automatically. Thus, the individualization problem of the sketch may be solved with low cost. In addition, the styles or skills may be configured by users, therefore the present invention makes it possible for everyone to own an individualized network sketch and is suitable for individualized sketch presence of network users such as Instant Messaging users.

DETAILED DESCRIPTION OF THE INVENTION

The present invention will be described in detail hereinafter with reference to accompanying drawings and embodiments to make the solution and merits therein clearer. It should be understood that the embodiments are used for explaining the present invention but not for limiting the protection scope of the present invention.

The present invention will be described in detail hereinafter with reference to accompanying drawings and embodiments.

The sketch generating system and the method for generating a sketch based on an image provided by embodiments of the present invention may automatically convert any image into a sketch. For sake of convenience and clarity, the technical scheme of the present invention will be described by taking the generation of a facial sketch from a facial image as an example. The facial image refers to an image reflecting a person's face, such as a facial photo or portrait. In this embodiment, the facial photo will be taken as an exemplary facial image. The sketch refers to a picture drawn by an artist, such as a cartoon picture. In this embodiment, a facial cartoon sketch will be taken as an exemplary sketch.

Figure 1:
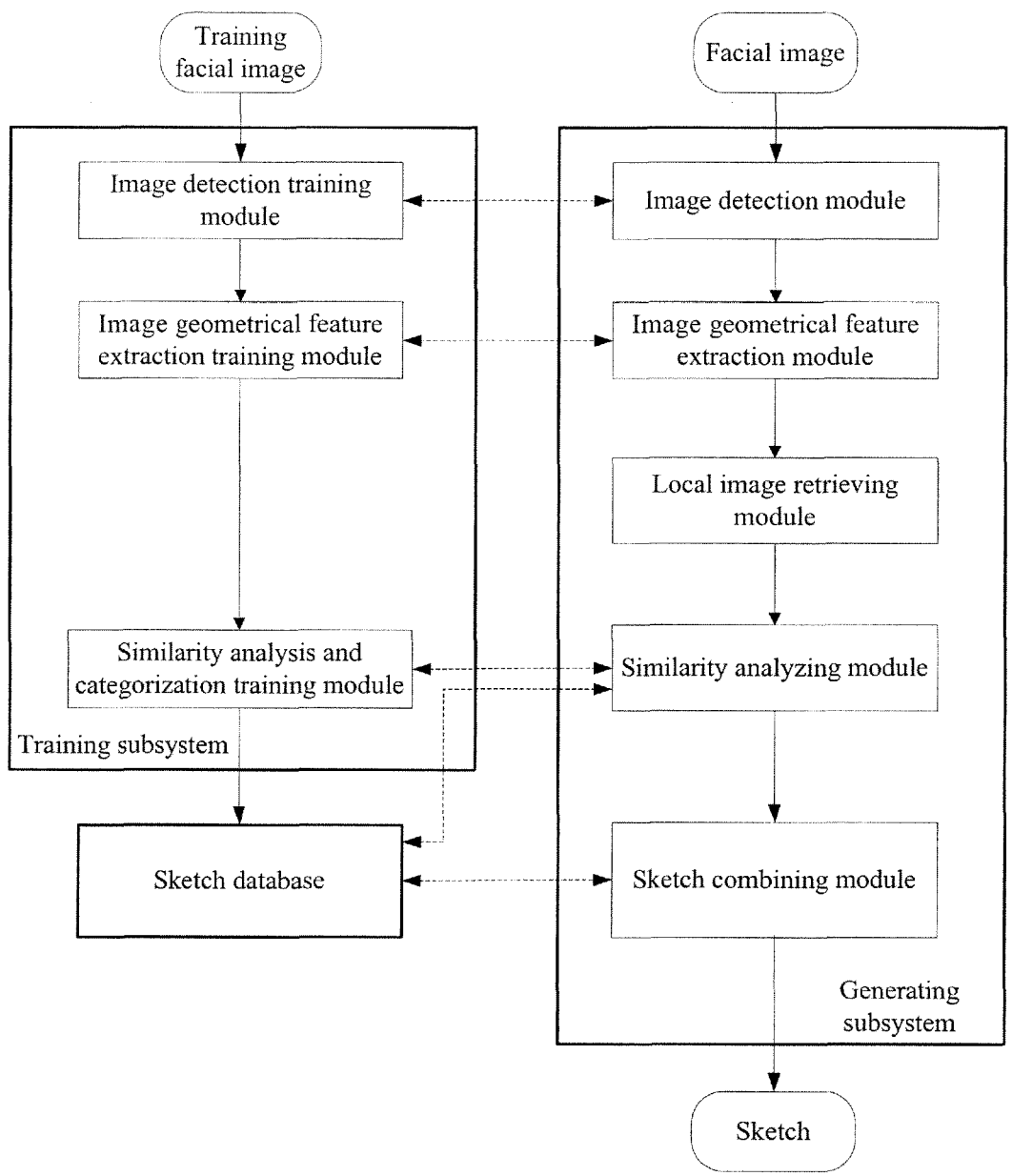
FIG. 1 is a schematic diagram illustrating a structure of a sketch generating system according to an embodiment of the present invention.

FIG. 1 is a schematic diagram illustrating a sketch generating system according to an embodiment of the present invention. As shown in FIG. 1, the sketch generating system includes a sketch database, a training subsystem and a generating subsystem.

The sketch database is adapted to store local image samples and corresponding local sketch units in different categories. A local sketch unit refers to one local sketch, e.g. one cartoon organ sketch.

The training subsystem is adapted to generate a training model and the local image samples according to training image samples; generate the corresponding local sketch units according to the local image samples; save the local image samples and the corresponding local sketch units into the sketch database in different categories. The training model includes an effective area detection model and an Active Shape Model.

The generating subsystem is adapted to extract geometrical features from an input image (e.g. an input facial image), retrieve local image units from the input image according to the geometrical features; with respect to each local image unit, search the sketch database for a local sketch unit corresponding to a local image sample having a largest similarity value with the local image unit, and combine all local sketch units searched out into one sketch. A local image unit is one local image, e.g. an image of one person's facial organ (e.g. eyes or nose) in a photo.

As shown in FIG. 1, the training subsystem includes the following modules.

An image detection training module, adapted to train to detect a manually-identified effective area of each training image sample (e.g. a training facial image), generate a training model (e.g. an effective area detection model), and store the training model into the image detection training module. As to the facial image, the effective area is the face area, i.e. the position and the size of the person's face in the facial image. In this case, in the embodiment of the present invention, the effective area detection model is a face detection model. The face detection model may be used to detect a specific area of a person's face, i.e. the face area in one image.

An image geometrical feature extraction training module, adapted to train to extract geometrical features from the effective area of each training image sample (e.g. the face area of each training image sample), generate an Active Shape Model (ASM), and store the ASM into the image geometrical feature extraction training module. The ASM includes a global ASM and a local ASM.

A similarity analysis and categorization training module, adapted to retrieve local image samples (e.g. image samples of facial organs defined by local geometrical features) from the effective area of each training image sample according to the geometrical features extracted, extract characteristic parameters of each local image sample, perform a similarity analysis training, generate a similarity model, and store the similarity model in the similarity analysis and categorization training module. Furthermore, the similarity analysis and categorization training module is adapted to save the characteristic parameters of each local image sample into the sketch database, categorize the local image samples, generate at least one local sketch unit (e.g. a cartoon organ sketch) corresponding to each local image sample, and save the local image samples and the corresponding local sketch units into the sketch database in different categories.

In an embodiment of the present invention, the local image samples may be image samples of facial organs, and the facial organs may include a face shape and five sensory organs. Therefore, the above step of categorizing the local image samples may be categorizing the image samples of the facial organs according to the face shape and the five sensory organs, so that each sub-category in each type of image samples of the facial organs represents one true typical organ. As to each typical organ, at least one corresponding sketch organ is generated through sketching. Thereby, a mapping relationship between one typical organ and at least one sketch organ is generated, wherein different organ sketches may contain elements of different styles and different skills and each style or skill corresponds to at least one organ sketch. In addition, the steps of categorizing the local image samples and generating the at least one local sketch unit corresponding to each local image sample may also be performed manually, i.e. it is possible to manually categorize the local image samples and generate the corresponding local sketch units.

As shown in FIG. 1, the generating subsystem includes the following modules.

An image detecting module, adapted to detect an effective area (e.g. a face area, i.e. position and size of a person's face) of an input image (e.g. an input facial image) according to the effective area detection model (e.g. the face detection model) stored in the image detection training module.

An image geometrical feature extracting module, adapted to extract geometrical features from the detected effective area (e.g. the face area) according to the ASM stored in the image geometrical feature extraction training module. The geometrical features include global geometrical features and local geometrical features. The geometrical features refer to feature points capable of describing the geometrical features of the person's face and shape vectors formed by the feature points. The global geometrical features include the feature points reflecting geometrical features of the whole face and the local geometrical features include the feature points reflecting geometrical features of each organ.

A local image retrieving module, adapted to retrieve each local image unit (e.g. image of each facial organ, including a face shape image and the five sensory organ images) from the effective area (e.g. the face area) according to the geometrical features.

A similarity analyzing module, adapted to analyze, with respect to each local image unit, a similarity between the local image unit (e.g. the image of each facial organ) and each local image sample (e.g. the image samples of the facial organs) stored in the sketch database according to the similarity model stored in the similarity analysis and categorization training module; obtain a local image sample having a largest similarity value with the local image unit. As a preferred embodiment, the similarity analyzing may be performed for each local image unit in a certain sequence (e.g. first to the face shape image and then to the five sensory organ images; or, first to the five sensory organ images and then to the face shape image).

A sketch combining module, adapted to retrieve from the sketch database, with respect to each local image unit, a local sketch unit (e.g. a cartoon organ sketch) corresponding to the local image sample (e.g. a facial organ image sample) having the largest similarity value to the local image unit and combine all local sketch units retrieved into one sketch (e.g. a facial sketch) according to the global geometrical features.

In addition, in an embodiment of the present invention, instead of retrieving from the sketch database the local sketch units respectively corresponding to local image samples which respectively have the largest similarity value with the local image units and then combining the retrieved local sketch units into one sketch, the sketch combining module may directly take one or more local image units retrieved as the local sketch units according to a user instruction. In this case, the combined sketch not only keeps some true parts of the input image but also contains some cartoon organ sketches.

In addition, the generating subsystem further includes scaling processing modules (not shown in FIG. 1), i.e. configure a scaling processing module respectively in the image detecting module and the local image retrieving module to scale the effective area detected by the image detecting module or the local image units retrieved by the local image retrieving module.

In an embodiment of the present invention, the similarity analysis and categorization training module may further generate local sketch units of different styles or skills for each local image sample, so that the sketch database can store cartoon organ sketches of different styles or skills for each image sample of a facial organ. Therefore, the sketch combining module may further include a style selecting unit (not shown in FIG. 1), adapted to output style options to a user so as to enable the user to select a required style through a selection instruction according to the style options. The style selecting unit receives the selection instruction from the user, selects one cartoon organ sketch from multiple cartoon organ sketches corresponding to the image sample of a facial organ, and takes the selected cartoon organ sketch as a local sketch unit corresponding to the image sample of the facial organ for forming the facial sketch.

Figure 2:
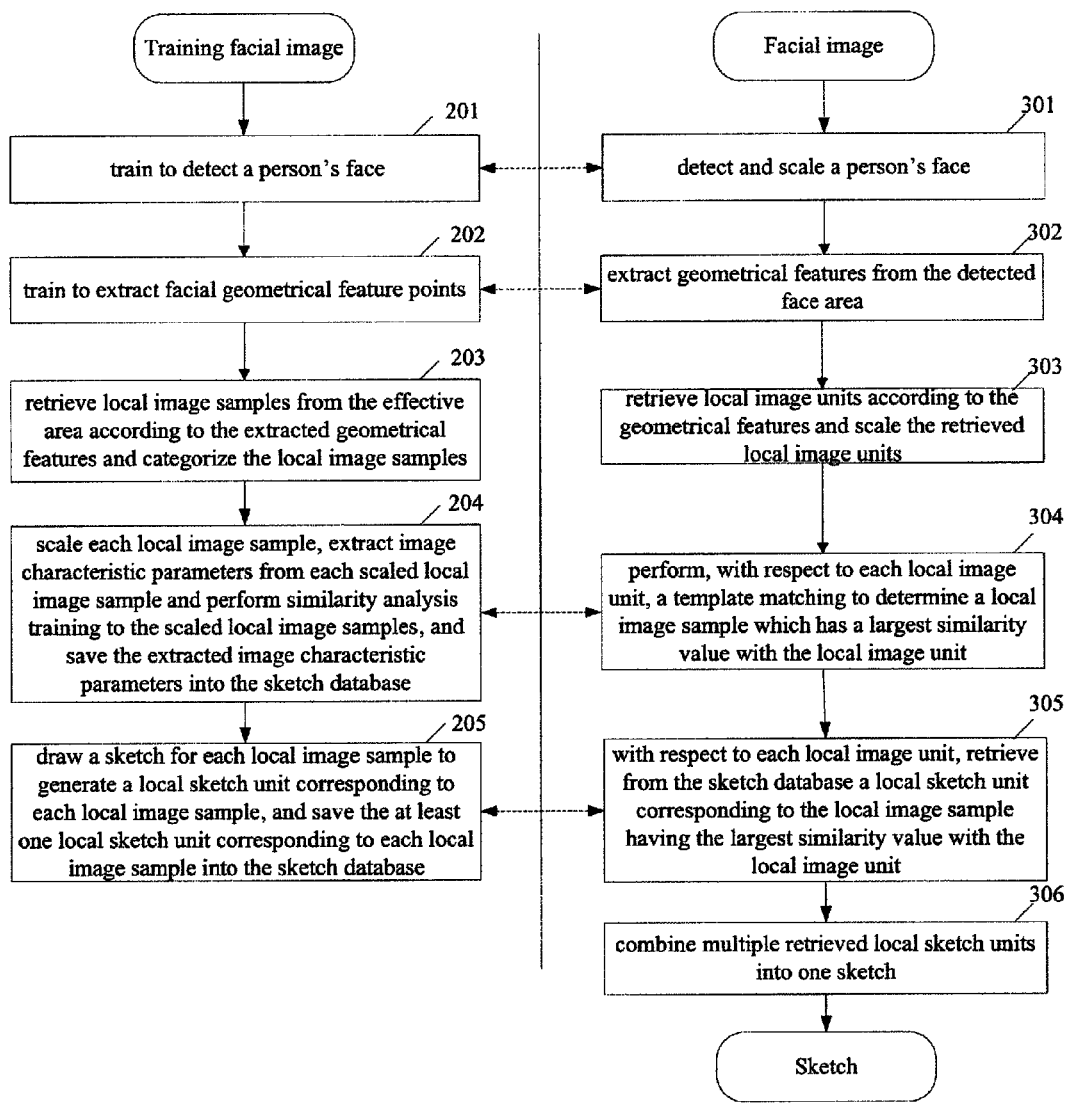
FIG. 2 is a flowchart of a method for generating a sketch corresponding to a facial image according to an embodiment of the present invention.
Figure 3:
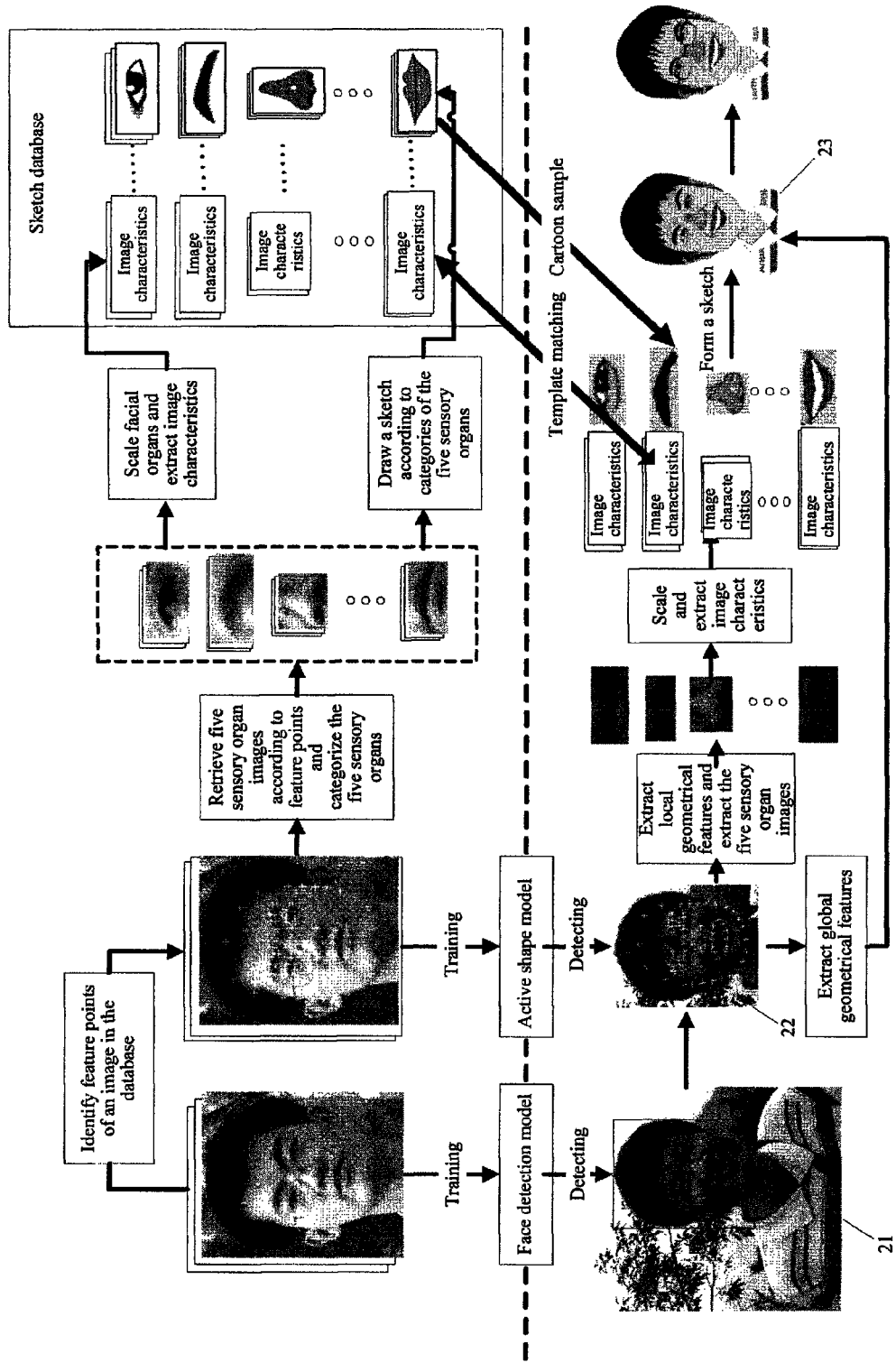
FIG. 3 is a schematic diagram illustrating a method for generating a sketch corresponding to a facial image according to an embodiment of the present invention.

FIG. 2 is a flowchart of a method for generating a sketch corresponding to a facial image according to an embodiment of the present invention. FIG. 3 is a schematic diagram illustrating the method for generating the sketch corresponding to the facial image according to the embodiment of the present invention.

As shown in FIG. 2 and FIG. 3, the method for generating the sketch corresponding to the facial image in this embodiment includes a training phase and a generating phase. In FIG. 2, the left part shows the training phase and the right part shows the generating phase. In FIG. 3, the upper part illustrates the training phase and the lower part illustrates the generating phase.

The training phase mainly includes the following steps 201 to 205.

Step 201: train to detect a person's face.

In this embodiment, firstly, an AdaBoost effective area detection technique is adopted to train the detection of the person's face (because the effective area in this embodiment is a facial area, the effective area detection technique is a facial detection technique in this embodiment). And then a training model is generated. Specifically, the image detection training module detects at least one training image sample (e.g. a training facial image). As to each training facial image, a specific position of the person's face in the training facial image is manually inputted into the image detection training module. Then, by the AdaBoost effective area detection technique, the image detection training module is trained according to the training facial image and the specific position of the person's face in the training facial image, so as to obtain the training model (e.g. the face detection model) which is capable of accurately detecting a person's face area. During a face detection procedure in subsequent generating phase, the face area may be accurately detected from a facial image by the face detection model. Specific detecting and training processes may be implemented by the existing AdaBoost effective area detection technique, which will not be described herein.

Step 202: train to extract facial geometrical feature points.

In this embodiment, the extraction of the facial geometrical features (i.e. the geometrical feature points) needs to be trained, so as to generate an Active Shape Model (e.g. a global Active Shape Model or a local Active Shape Model) used for extracting facial geometrical feature parameters in the subsequent generating phase. The ASM is a point distribution model for associated modeling of a physical key point group. Specifically, during the training phase, it is required to manually identify facial key feature points (also referred to as feature points) of a training image sample (e.g. a training facial image) and give a standardized training set $T=\{(I_i,s_i)|i=1,\ldots,m\}$ identified with the facial key feature points through the ASM; wherein m denotes the number of training image samples, $l_i$ denotes the $i^{th}$ image sample in the standardized training set, $s_i=\{(x_{ij},y_{ij})|j=1,\ldots,n\}$ denotes a shape vector of the image sample $l_i$ formed by n manually identified facial key feature points, and j denotes the $j^{th}$ identified feature point. Next, all shape vectors are iteratively aligned in a tangent space to obtain a new shape training set: $T'=\{(I'_i,s'_i)|i=1,\ldots,m\}$, wherein $I'_i$ denotes an image obtained by scaling $l_i$ to a specific size, and $s'_i$ denotes a shape vector obtained by scaling $s_i$ in the tangent space. Then, perform a Principal Components Analysis (PCA) to T' to obtain an Active Shape Model shown in a following formula (1):

$$s=\bar{s}+\Phi_s \cdot b_s \qquad (1)$$

In the formula (1), s denotes any facial shape vector, and $\bar{s}$ denotes an average shape vector, $b_s$ is a shape adjusting parameter, and $\phi_s$ is a main body of a characteristic vector obtained by the PCA. The $\phi_s$ may be obtained by performing singular value decomposition to a covariance matrix of the standardized training set T' and each column vector of $\phi_s$ describes one shape changing pattern. The formula (1) can be understood as: any facial shape vector s can be represented as a transformation of the average shape vector $\bar{s}$, and this transformation is performed in a pattern space designated by $\phi_s$ under the control of the parameter $b_s$.

The formula (1) is a global Active Shape Model for the whole face. This global Active Shape Model is stored in the image geometrical feature extraction training module. In this step, global geometrical feature parameters of the whole face may be extracted from the detected face area by the global Active Shape Model. The global geometrical feature parameters are key feature points capable of outlining the geometrical features of the person's face.

In addition, as to each feature point of a facial shape, it is possible to train to generate a local texture Active Shape Model. Further, the local texture Active Shape Model may also be obtained through training based on the existing ASM. The detailed training process is similar to that of the global Active Shape Model and will not be described again herein.

Step 203: retrieve local image samples from the effective area according to the extracted geometrical features and categorize the local image samples.

In this step, the local image samples (e.g. five sensory organ image samples or a face shape image sample) are retrieved from the effective area of each training image sample according to the geometrical features extracted (i.e. the feature points identified on the training facial image). Categorize the local image samples (e.g. the five sensory organ image samples or the face shape image sample) manually and then save them into the sketch database in different categories. Through categorizing the face shape image samples and the five sensory organ image samples of a large number of facial images, this step makes each sub-category in each type of local image samples represent one type of true typical organ.

Step 204: scale each local image sample, extract image characteristic parameters from each scaled local image sample and perform similarity analysis training to the scaled local image samples, generate a similarity model, and save the extracted image characteristic parameters into the sketch database.

Step 205: draw a sketch for each local image sample according to categorization of the local image samples in Step 203 to generate at least one local sketch unit (e.g. an cartoon organ sketch) corresponding to each local image sample, and save the at least one local sketch unit (e.g. the cartoon organ sketch) corresponding to each local image sample into the sketch database. Further, as to a typical organ of each local image sample, multiple cartoon organ sketches with different styles or skills may be generated.

Hereinafter, the generation of a cartoon sketch based on a facial image will be taken as an example for describing the generating phase of the sketch provided by the embodiment of the present invention. As shown in FIG. 2 and FIG. 3, the generating phase of the sketch includes following steps:

Step 301: detect and scale a person's face.

Specifically, as to an input facial image 21 (e.g. a facial photo), a detail area (x, y, s) where the face is located may be detected from the facial image 21 by the effective area detection model (e.g. the face detection model) obtained in Step 201 according to the AdaBoost face detection technique, wherein x and y denotes coordinates of a top left corner of a detected rectangle area of the face and s denotes an initial size of the face. The detected face area should contain features of the face as many as possible. Next, the detected face area 21 is scaled and a standard face area 22 is thereby obtained. The scaling refers to zoom in/zoom out the detected face area to a standardized size so as to enable the system to process the detected face area according to the standardized size. Specifically, the scaling refers to zoom in/zoom out the detected face area 21 to make $s=s_{const}$, wherein $s_{const}$ is a standardized face size defined in advance.

Step 302: extract geometrical features from the detected face area.

In the embodiment of the present invention, the geometrical features may be extracted from the scaled face area 22 according to the Active Shape Model obtained in Step 202. The geometrical features include global geometrical features and local geometrical features. The geometrical features refer to feature points capable of describing the geometrical features of the face and shape vectors formed by the feature points. The global geometrical features include the feature points reflecting geometrical features of the whole face and the local geometrical features include the feature points reflecting geometrical features of each organ.

Step 303: retrieve local image units according to the geometrical features and scale the retrieved local image units.

In the embodiment of the present invention, each local image unit of the face (i.e. the image of each local organ) may be retrieved from the face area 22 according to the feature points reflecting geometrical features of each organ. For example, images of organs such as face, eyes, eyebrows, nose and mouth are respectively retrieved and scaled to comply with the standard shape and size of the ASM.

Step 304: perform, with respect to each local image unit, a template matching to determine a local image sample which has a largest similarity value with the local image unit.

In the embodiment of the present invention, a face similarity matching technique may be adopted to analyze a similarity between the local image unit (e.g. local organ image) and each local image sample pre-stored in the sketch database according to the similarity model obtained in Step 204, so as to obtain a similarity value between the local image unit and each corresponding local image sample, and then determine a local image sample having the largest similarity value with the local image unit.

In Step 304, considering characteristics of different facial organs, different processing policies may be applied to different organs. For example, a same processing policy may be applied to eyes, eyebrows and nose; whereas a more complicated scaling pre-processing policy may be applied to the mouth because the mouth has more non-rigid transformations; and a shape matching algorithm may be applied a facial contour to obtain a similarity between facial contours because the facial contour contains boundary information and has qualities of a concave object.

Figure 4:
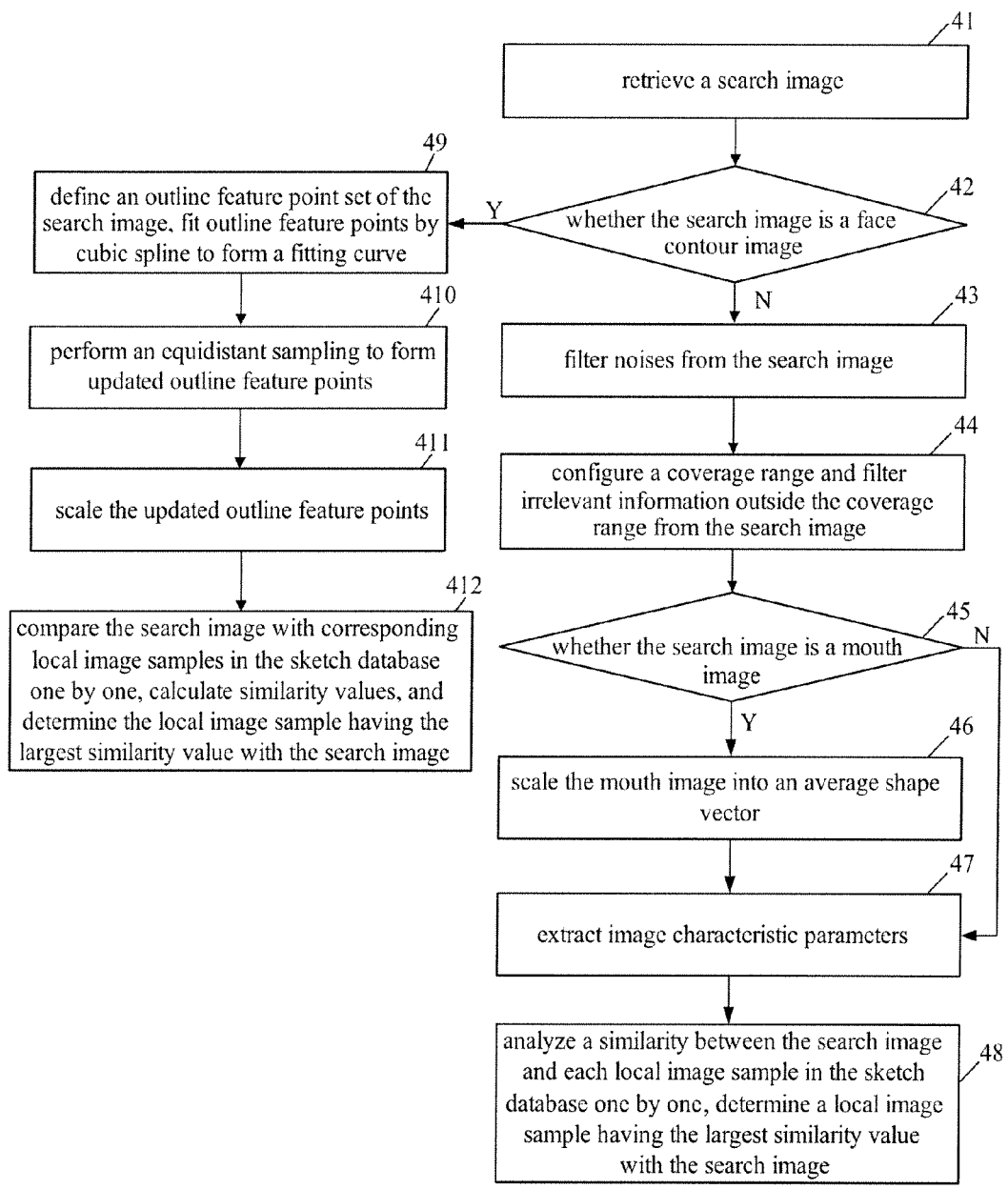
FIG. 4 is a flowchart of a method for determining an image similarity according to an embodiment of the present invention.

In Step 304, the face similarity matching technique is a semantically-based method for determining an image similarity. FIG. 4 is a flowchart of a method for determining an image similarity according to an embodiment of the present invention. In this embodiment of the present invention, the procedure shown in FIG. 4 should be performed to each local organ image and the procedure includes:

Step 41: retrieve a search image.

In this step, a rectangle image area which can exactly surround a specific organ is retrieved from the scaled local organ image and is taken as the search image.

Step 42: determine whether the search image is a face contour image; if the search image is a face contour image, proceed to step 49; otherwise, proceed to step 43.

Step 43: filter noises off the search image.

Specifically, a Gauss operator may be adopted to filter the noises.

Step 44: configure a coverage range and filter irrelevant information outside the coverage range off the search image.

In the embodiment of the present invention, the coverage range may be configured by steps of:

a) retrieve a feature point set of the organ from the search image according to the ASM algorithm: $s_{ic}=\{(x_{ic},y_{ic})|i=1,\ldots n_c, c\in C\}$, wherein $s_{ic}$ denotes the feature point set corresponding to organ c, and C denotes a set of all organs, and $n_c$ denotes the number of feature points of the organ c.

b) fit an outline of an organ image by cubic spline.

c) calculate a positioning precision of the above algorithm according to $N_t$ pre-identified test images (i.e. facial feature points identified manually according to the ASM algorithm), identify a positioning of a feature point i of $s_{ic}$ in a test image m as $(x_{icm}, y_{icm})$, define an error between a manually-identified result and the positioning result as $d_{icm}=|x_{icm}-x_{icm}^a|$, wherein $x_{icm}^a$ denotes the manually-identified result; define an epitaxial area along the x direction from the point i in the coverage area as:

$$d_{xi} = 3\sqrt{\frac{1}{N_t-1}\sum_{m=1}^{N_t}(d_{icm}-\overline{d_{icm}})^2},$$

and define an epitaxial area along the y direction as $$d_{yi} = 3\sqrt{\frac{1}{N_t-1}\sum_{m=1}^{N_t}(d_{icm}-\overline{d_{icm}})^2},$$

wherein $\overline{d_{icm}}$ is an average error.

d) define the boundary of the coverage area at the $i_c$ point by $(d_{xic}+x_{ic}, d_{yic}+y_{ic})$, and fit boundary points by cubic spline to form a surrounded coverage area.

After the coverage area is formed, the irrelevant information outside the coverage area may be filtered out from the search image.

Step 45: determine whether the search image is a mouth image; if the search image is a mouth image, proceed to step 46; otherwise, proceed to step 47.

Step 46: scale the mouth image into an average shape vector.

In this step, the Active Shape Model shown in the formula (1) based on the ASM algorithm is adopted to scale the mouth image into the average shape vector. This step is performed because the mouth image is an area with the richest expressions on the person's face and one mouth may generally form varieties of typical images. For example, one person may have quite different mouth images when he/she smiles, laughs or cries. Therefore, it is necessary to scale the mouth image to obtain a standard mouth image.

Step 47: extract image characteristic parameters.

In this step, a sober operator for edge detection may be adopted to extract the image characteristic parameters from the search image (i.e. the search image after being processed by step 44 or 46). The image characteristic parameters mainly include a gradient strength parameter and a direction image characteristic parameter.

Step 48: analyze a similarity between the search image and each local image sample in the sketch database one by one, determine a local image sample having the largest similarity value with the search image, and terminate step 304.

In this step, because all local image samples in the sketch database are standardized images, the similarity is analyzed between the search image and each corresponding local image sample one by one (e.g. the similarity is calculated in a template matching method) according to the extracted image characteristic parameters of the search image, and the local image sample having the largest similarity value with the search image is selected. Then step 304 is terminated. The similarity may be calculated through: performing a matching calculation between the image characteristic parameters of the search image obtained in step 47 and the image characteristic parameters of each corresponding local image sample in the sketch database, and obtaining a corresponding similarity.

Because the facial contour is a relatively special area and the facial contour data is boundary information and has qualities of a concave object, it is difficult to perform matching directly according to an area image. Instead, it is required to calculate the similarity according to a shape matching algorithm. Refer to step 49 for details:

Step 49: define an outline feature point set of the search image as: $s_{iw} = \{(x_i, y_i) | i=1, \ldots, n_w\}$, fit outline feature points by cubic spline to form a fitting curve.

Step 410: perform an equidistant sampling to form updated outline feature points.

In this step, the equidistant sampling may be performed on the fitting curve to form an updated outline feature point set $s_{iw}' = \{(x_i', y_i') | i=1, \ldots, n_w\}$, wherein $n_w$ the number of outline feature points on the outline and it is supposed that $$x_i' = x_i' - \frac{1}{n_w} \sum_i x_i' \text{ and } y_i' = y_i' - \frac{1}{n_w} \sum_i y_i'.$$

Step 411: scale the updated outline feature points, i.e. transform distribution of the updated outline feature points to standard coordinates according to a formula: $\|s_{iw}'\| = 1$.

Step 412: compare the search image with corresponding local image samples in the sketch database one by one, calculate similarity values, and determine the local image sample having the largest similarity value with the search image.

In an embodiment of the present invention, an existing Earth Mover Distance method may be adopted to compare the facial search image with each standardized local image sample (e.g. facial contour image sample) in the sketch database one by one, calculate the similarity values, and determine the local image sample having the largest similarity value with the search image.

Through the above Steps 41 to 412, a local image sample having the largest similarity value with each local organ image (e.g. the five sensory organ images or face shape image) may be obtained.

Step 305: perform cartoon sampling, i.e. with respect to each local image unit, retrieve from the sketch database a local sketch unit corresponding to the local image sample having the largest similarity value with the local image unit.

In this step, as to each local image unit (e.g. local organ image), a local sketch unit corresponding to the local image sample having the largest similarity value with the local image unit is found from the sketch database, and the local sketch unit is taken as a cartoon expression of the local image unit.

In addition, in an embodiment of the present invention, because the sketch database stores at least one local sketch unit (e.g. cartoon organ sketch) with different styles or skills for each local image sample. Therefore, in this step, style options may be further outputted to a user so that the user is able to select a required style or skill through a selection instruction according to the style options. After the selection instruction is received from the user, one local sketch unit is selected from multiple local sketch units corresponding to the local image sample which has the largest similarity value with the local image unit, and the selected local sketch unit is taken as a local sketch unit which corresponds to the local image unit and is used for forming the facial sketch.

In the above Step 305, instead of retrieving from the sketch database, with respect to each local image unit, a local sketch unit corresponding to the local image sample having the largest similarity value with the local image unit and then combine the retrieved local sketch units into one sketch, it is also possible to directly take one or more retrieved local image units as the corresponding local sketch units according to a user instruction. That is, a local sketch unit may also be a retrieved local image unit.

Step 306: form a sketch, i.e. combine multiple retrieved local sketch units into one sketch 23.

In an embodiment of the present invention, because each local image sample corresponds to several local sketch units (e.g. cartoon organ sketches) in the sketch database and the cartoon organ sketches are expressed in a vector format, the present invention may further include: defining different local image units (e.g. facial organs) in layers of different depths according to shading relationships, i.e. pre-configuring deep relationships between different local image units according to the shading relationships. The layers are similar to those in Photoshop. And images in layers of different depths may be overlapped to form one image.

Then, according to position relationships reflected by the global geometrical features of the facial organs extracted by the ASM algorithm and the depth relationships per-configured, the local sketch units (e.g. the cartoon organ sketches) respectively corresponding to the local image units are placed onto a canvas to generate a facial sketch with cartoon effect.

In addition, since the cartoon organ sketches in the sketch database are expressed in a vector format which supports operations such as transforming, filling, and layer-hiding checking, varieties of complicated cartoon styles may be generated. For example, in FIG. 3, the face in the facial image 21 during the generating phase wears glasses and thus the global geometrical features include feature points of the glasses. Therefore, the filling operation may be adopted to add one sketch unit of the glasses into the sketch 23 at a corresponding position, and the actual appearance of the facial image can be reflected better.

Besides, since some global sketch units may be the local image units in the above Step 305, the sketch obtained in Step 306 not only keeps some true parts of the input image but also contains some cartoon organ sketches.

The foregoing is only embodiments of the present invention. The protection scope of the present invention, however, is not limited to the above description. Any change or substitution, easily occurring to those skilled in the art, should be covered by the protection scope of the present invention.

What is claimed is:

1. A sketch generating system, comprising:
   a sketch database and a generating subsystem; wherein
   the sketch database is adapted to store local image samples and corresponding local sketch units in different categories;
   the generating subsystem is adapted to extract geometrical features from an input image, retrieve local image units from the input image according to the geometrical features; with respect to each local image unit retrieved, search the sketch database for a local sketch unit corresponding to a local image sample having a largest similarity value with the local image unit, and combine all local sketch units to form one sketch.

2. The sketch generating system of claim 1, further comprising:
   a training subsystem, adapted to generate a training model and local image samples according to training image samples, generate corresponding local sketch units according to the local image samples, and save the local image samples and the corresponding local sketch units in the sketch database in different categories.

3. The sketch generating system of claim 2, wherein the training subsystem comprises:
an image detection training module, adapted to train to detect an effective area of each training image sample, and generate an effective area detection model;
an image geometrical feature extraction training module, adapted to train to extract geometrical features from the effective area of each training image sample and generate an Active Shape Model;
a similarity analysis and categorization training module, adapted to retrieve the corresponding local image samples from the effective area of each training image sample according to the geometrical features, extract characteristic parameters of each local image sample, perform a similarity analysis training to generate a similarity model, and save the characteristic parameters of each local image sample into the sketch database; categorize the local image samples, and generate at least one corresponding local sketch unit corresponding to each local image sample, and save the local image samples and the corresponding local sketch units into the sketch database in different categories.

4. The sketch generating system of claim 3, wherein the generating subsystem comprises:
an image detecting module, adapted to detect an effective area of the input image according to the effective area detection model;
an image geometrical feature extracting module, adapted to extract the geometrical features from the detected effective area according to the Active Shape Model;
a local image retrieving module, adapted to retrieve the local image units from the effective area according to the geometrical features;
a similarity analyzing module, adapted to analyze, with respect to each local image unit, a similarity between the local image unit and each local image sample in the sketch database according to the similarity model, obtain the local image sample having a largest similarity value with the local image unit;
a sketch combining module, adapted to retrieve the local sketch units respectively corresponding to the local image samples having the largest similarity values with the local image units from the sketch database, and combine all the local sketch units retrieved into one sketch according to global geometrical features.

5. The sketch generating system of claim 4, wherein the sketch combining module is further adapted to directly take at least one local image unit as at least one local sketch unit according to a user instruction.

6. The sketch generating system of claim 4, wherein the generating subsystem further comprises:
a scaling processing module, adapted to scale the effective area detected by the image detecting module or the local image units retrieved by the local image retrieving module.

7. The sketch generating system of claim 4, wherein
the similarity analysis and categorization training module is further adapted to generate at least one local sketch unit of different styles for each local image sample; and
the sketch combining module further comprises a style selecting unit, adapted to output style options to a user and receive a selection instruction from the user, select one of the at least one local sketch unit corresponding to the local image sample as a local sketch unit corresponding to the local image unit according to the user's selection instruction.

8. A method for generating a sketch based on an image, comprising:
A: saving local image samples and corresponding local image units into a sketch database in advance;
B: extracting geometrical features from an input image, retrieving local image units from the input image according to the geometrical features; with respect to each local image unit retrieved, searching the sketch database for a local sketch unit corresponding to a local image sample having a largest similarity value with the local image unit, and combining all local sketch units to generate one sketch.

9. The method of claim 8, before the step B, further comprising:
B0: generating a training model and local image samples according to a training image sample, generating corresponding local sketch units according to the local image samples; and saving the local image samples and the corresponding local sketch units into the sketch database.

10. The method of claim 9, wherein the step B0 comprises:
a1: train to detect an effective area of the training image sample according to an effective area detecting technique, and generating an effective area detection model;
a2: train to extract geometrical features of the effective area, and generating an Active Shape Model;
a3: retrieving the local image samples from the effective area according to the geometrical features extracted and categorizing the local image samples;
a4: extracting characteristic parameters of each local image sample and performing similarity analysis training, generating a similarity model, and saving the characteristic parameters of each local image sample into the sketch database;
a5: generating at least one local sketch unit for each local image sample, and saving the at least one local image sample and the corresponding local sketch unit into the sketch database.

11. The method of claim 10, wherein the generating the at least one local sketch unit for each local image sample in step a5 comprises:
generating multiple local sketch units of different styles or skills for each local image sample.

12. The method of claim 10, wherein the step B comprises:
b1: detecting an effective area of the input image according to the effective area detection model;
b2: extracting the geometrical features from the effective area according to the Active Shape Model;
b3: retrieving the local image units from the effective area according to the geometrical features;
b4: with respect to each local image unit, analyzing a similarity between the local image unit and each the local image sample in the sketch database according to the similarity model, and obtaining a local image sample having a largest similarity value with the local image unit;
b5: with respect to each local image unit, retrieving from the sketch database the local sketch unit corresponding to the local image sample having the largest similarity value with the local image unit;
b6: combining all the local sketch units retrieved into one sketch according to the geometrical features.

13. The method of claim 12, wherein the step b5 comprises:

taking at least one local image unit as at least one local sketch unit according to a user instruction.

14. The method of claim 12, wherein the input image is a facial image and the local image units are respectively local organ images on a person's face;

wherein the step b4 comprises:
- c1: retrieving a rectangle image area surrounding a specific organ from a local organ image and taking the rectangle image area as a search image;
- c2: determining whether the search image is a facial contour image, proceeding to step c9 if the search image is a facial contour image, proceeding to step c3 if the search image is not a facial contour image;
- c3: filtering noises off the search image;
- c4: configuring a coverage range and filtering irrelevant information outside the coverage range from the search image;
- c5: determining whether the search image is a mouth image; proceeding to step c6 is the search image is a mouth image; proceeding to step c7 if the search image is not a mouth image;
- c6: scaling the mouth image into an average shape vector;
- c7: extracting image characteristic parameters from the search image;
- c8: analyzing a similarity between the search image and each local image sample in the sketch database one by one according to the image characteristic parameters, determining a local image sample which has a largest similarity value with the search image, and terminating step b4;
- c9: defining an outline feature point set of the search image and fitting outline feature points by cubic spline to form a fitting curve;
- c10: performing equidistant sampling on the fitting curve to form an updated outline feature point set;
- c11: scaling the outline feature points;
- c12: compare the search image with corresponding local image samples in the sketch database one by one, calculate similarity values, and determine a local image sample having the largest similarity value with the search image.

15. The method of claim 12, wherein the step b5 comprises: outputting style options to a user, and selecting one local sketch unit from multiple local sketch units corresponding to the local image sample which has the largest similarity value with the local image unit, and taking the local sketch unit selected as a local sketch unit corresponding to the local image unit.

16. The method of claim 12, wherein depth relationships between different local image units are pre-configured according to a hiding relationship; and the step b6 comprises:
placing the local sketch units respectively corresponding to all the local image units retrieved onto a canvas to form one sketch.

17. The method of claim 12, further comprising:
after the step b1, scaling the effective area;
after the step b3, scaling each local image unit.

18. The method of claim 8, wherein the input image is a facial image, the local image unit is a local organ image of a person's face and the local sketch unit is a cartoon organ sketch.

19. The method of claim 9, wherein the input image is a facial image, the local image unit is a local organ image of a person's face and the local sketch unit is a cartoon organ sketch.

20. The method of claim 10, wherein the input image is a facial image, the local image unit is a local organ image of a person's face and the local sketch unit is a cartoon organ sketch.

* * * * *